(12) United States Patent
Simon et al.

(10) Patent No.: US 12,487,354 B2
(45) Date of Patent: Dec. 2, 2025

(54) CONTENT CAPTURE OF AN ENVIRONMENT OF A VEHICLE USING A PRIORI CONFIDENCE LEVELS

(71) Applicant: Valeo Schalter und Sensoren GmbH, Bietigheim-Bissingen (DE)

(72) Inventors: Martin Simon, Kronach Neuses (DE); Johannes Petzold, Kronach Neuses (DE); Marco Heinen, Kronach Neuses (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 434 days.

(21) Appl. No.: 18/053,420

(22) Filed: Nov. 8, 2022

(65) Prior Publication Data

US 2023/0146935 A1    May 11, 2023

(30) Foreign Application Priority Data

Nov. 9, 2021 (DE) .......................... 102021129070.8

(51) Int. Cl.
| | |
|---|---|
| *G01S 13/931* | (2020.01) |
| *B60W 60/00* | (2020.01) |
| *G01S 13/89* | (2006.01) |
| *G01S 17/89* | (2020.01) |
| *G01S 17/931* | (2020.01) |

(Continued)

(52) U.S. Cl.
CPC ............ *G01S 13/931* (2013.01); *G01S 13/89* (2013.01); *G01S 17/89* (2013.01); *G01S 17/931* (2020.01); *G06N 3/08* (2013.01); *G07C 5/085* (2013.01); *B60W 60/001* (2020.02); *B60W 2420/408* (2024.01)

(58) Field of Classification Search
CPC ........ G01S 13/89; G01S 13/931; G01S 17/89; G01S 17/931; G06N 3/08; G07C 5/085; B60W 60/001; B60W 2420/408
USPC ........................................................... 342/70
See application file for complete search history.

(56) References Cited

U.S. PATENT DOCUMENTS

| | | | |
|---|---|---|---|
| 8,994,591 B2* | 3/2015 | Dupray | H04W 64/00 |
| | | | 342/465 |
| 9,020,697 B2* | 4/2015 | Ricci | A61B 5/4809 |
| | | | 701/36 |

(Continued)

*Primary Examiner* — Nuzhat Pervin
(74) *Attorney, Agent, or Firm* — Osha Bergman Watanabe & Burton LLP

(57) ABSTRACT

A method for the content capture of an environment of a vehicle is disclosed. The method uses an artificial intelligence neural network, on the basis of a point cloud generated by an environment sensor of the vehicle. The method involves performing reference measurements by the environment sensor to capture reference objects depending on positions in the environment in relation to the environment sensor, generating confidence values depending on positions in the environment in relation to the environment sensor on the basis of the reference measurements by the environment sensor to capture the reference objects, training the artificial intelligence for the content capture of the environment on the basis of training point clouds for the environment sensor, capturing the environment by the environment sensor to generate the point cloud, and processing the point cloud generated by the environment sensor using the trained artificial intelligence for the content capture of the environment.

10 Claims, 5 Drawing Sheets

Figure 1:
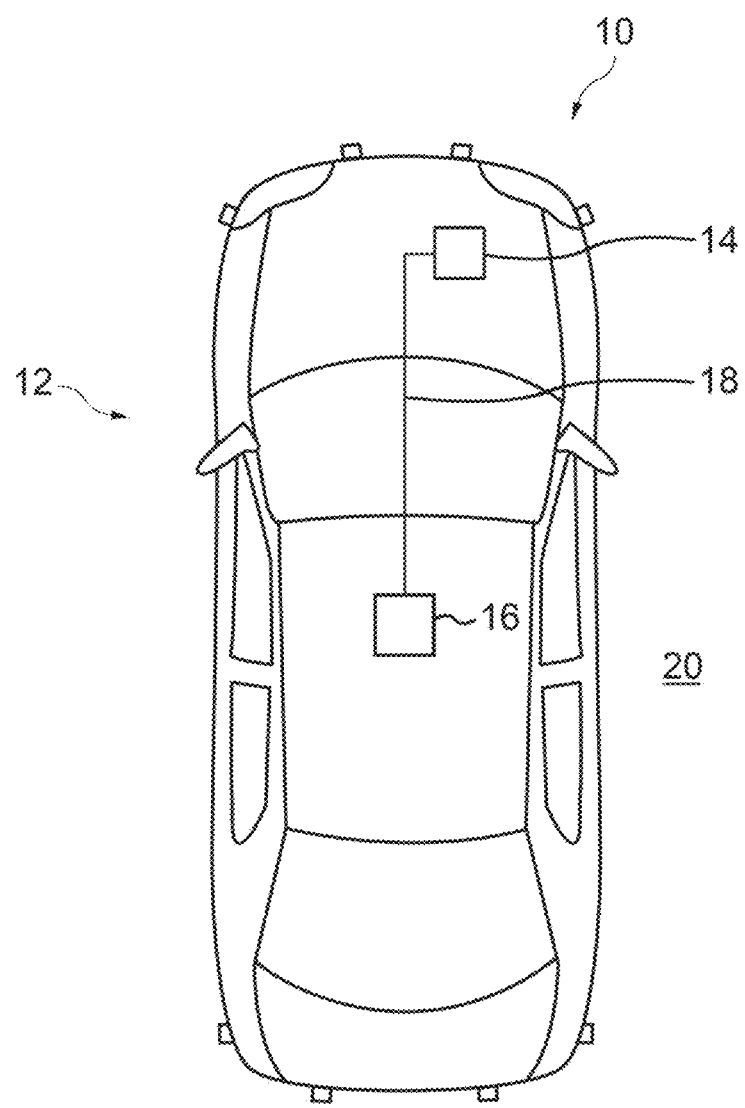

(51) Int. Cl.
*G06N 3/08* (2023.01)
*G07C 5/08* (2006.01)

(56) References Cited

U.S. PATENT DOCUMENTS

| | | | | |
|---|---|---|---|---|
| 9,342,888 | B2* | 5/2016 | Menashe | G06T 7/73 |
| 9,465,388 | B1* | 10/2016 | Fairfield | G05D 1/0088 |
| 9,855,894 | B1* | 1/2018 | Khorasani | G06V 20/588 |
| 9,911,030 | B1* | 3/2018 | Zhu | B60R 1/00 |
| 10,198,619 | B1* | 2/2019 | Zhu | G06V 20/64 |
| 10,351,137 | B2* | 7/2019 | Shin | B60W 30/18163 |
| 10,754,037 | B2* | 8/2020 | England | B60W 10/04 |
| 10,768,304 | B2* | 9/2020 | England | G06T 17/05 |
| 10,824,153 | B2* | 11/2020 | Zhang | G08G 1/167 |
| 10,845,814 | B2* | 11/2020 | Funayama | B60W 60/001 |
| 10,984,257 | B2* | 4/2021 | England | G06T 7/50 |
| 11,010,615 | B2* | 5/2021 | Rasmusson, Jr. | G01C 21/3638 |
| 11,385,856 | B2* | 7/2022 | Babb | G06F 3/1454 |
| 11,448,746 | B2* | 9/2022 | Stachnik | G01S 7/2921 |
| 11,550,322 | B1* | 1/2023 | Christie | G05D 1/628 |
| 11,625,041 | B2* | 4/2023 | Das | G06V 10/25 701/23 |
| 11,630,197 | B2* | 4/2023 | Unnikrishnan | G06F 18/23 382/104 |
| 12,090,928 | B2* | 9/2024 | Krämer | G01S 7/481 |
| 2019/0317217 | A1* | 10/2019 | Day | G06V 10/751 |
| 2020/0019160 | A1* | 1/2020 | McArthur | G01S 7/52004 |
| 2020/0198650 | A1* | 6/2020 | Ribbens | G07C 5/0808 |
| 2020/0371238 | A9* | 11/2020 | Day | G06V 10/141 |
| 2021/0286923 | A1* | 9/2021 | Kristensen | G01S 7/412 |
| 2022/0058895 | A1* | 2/2022 | Han | G01S 13/931 |
| 2022/0058948 | A1* | 2/2022 | Sakai | G08G 1/161 |
| 2022/0129228 | A1* | 4/2022 | Babb | G06F 3/147 |
| 2022/0171030 | A1* | 6/2022 | Beuschel | G01S 17/931 |
| 2023/0034560 | A1* | 2/2023 | Kamann | B60W 40/13 |
| 2023/0308844 | A1* | 9/2023 | Bersiner | G01S 13/88 |

* cited by examiner

CONTENT CAPTURE OF AN ENVIRONMENT OF A VEHICLE USING A PRIORI CONFIDENCE LEVELS

The present invention relates to a method for the content capture of an environment of a vehicle using an artificial intelligence, in particular a neural network, on the basis of a point cloud generated by at least one environment sensor of the vehicle.

The present invention furthermore relates to a driving assistance system for a vehicle having at least one environment sensor and a processing unit, which is connected to the at least one environment sensor via a data connection, the driving assistance system being designed to perform the above method.

Driving assistance systems for providing assistance when driving a vehicle typically capture an environment of the vehicle by at least one environment sensor in order to provide, for example, sensor information in the form of a point cloud. On the basis thereof, the driving assistance system can perform its desired assistance function. Automatic detection of contents and/or objects using an artificial intelligence (AI), in particular a neural network, is often performed here. The sensor information is processed using the artificial intelligence for the content capture of the environment in order to detect the contents/objects.

In real decision-making systems, classifications must not only be accurate but also indicate when they are probably false. If the artificial intelligence is not able to reliably predict, for example, the presence or absence of immediate obstacles in the environment of the vehicle on the basis of sensor information of an environment sensor, the vehicle should rely more heavily on the results of other sensors when braking. In particular, in addition to its object detection, an artificial intelligence should additionally provide a degree of confidence. The degree of confidence, referred to hereinbelow as the confidence level, indicates a probability associated with the predicted class designation of an object. The confidence level should reflect a correctness of a basic probability here. The confidence level is determined, for example, on the basis of the sensor information on which the detection of the objects was based. This determination is in principle inaccurate and furthermore prone to errors.

Proceeding from the aforementioned prior art, the object of the invention is thus to specify a method for the content capture of an environment of a vehicle using an artificial intelligence, in particular a neural network, on the basis of a point cloud generated by at least one environment sensor of the vehicle, as well as a driving assistance system for performing the method, which allow improved content capture and in particular allow improved determination of confidence levels for the contents in the environment of the vehicle.

The object is achieved according to the invention by the features of the independent claims. Advantageous configurations of the invention are specified in the dependent claims.

The invention thus specifies a method for the content capture of an environment of a vehicle using an artificial intelligence, in particular a neural network, on the basis of a point cloud generated by at least one environment sensor of the vehicle, comprising the steps of performing reference measurements by the at least one environment sensor of the vehicle in order to capture reference objects depending on positions in the environment in relation to the at least one environment sensor, generating confidence values depending on positions in the environment in relation to the at least one environment sensor on the basis of the reference measurements by the at least one environment sensor of the vehicle in order to capture the reference objects, training the artificial intelligence for the content capture of the environment of the vehicle on the basis of training point clouds for the at least one environment sensor, capturing the environment of the vehicle by the at least one environment sensor of the vehicle in order to generate the point cloud, and processing the point cloud generated by the at least one environment sensor of the vehicle using the trained artificial intelligence for the content capture of the environment, the method using the generated confidence values depending on the positions in the environment as a priori confidence levels in order to improve the content capture of the environment of the vehicle.

The invention furthermore specifies a driving assistance system for a vehicle having at least one environment sensor and a processing unit which is connected to the at least one environment sensor via a data connection, the driving assistance system being designed to perform the above method.

The basic concept of the present invention is thus to capture properties of the at least one environment sensor in relation to positions in the environment of the vehicle via the reference measurements and to generate therefrom a priori confidence values on the basis of which the contents of the environment can be reliably captured. As a result, a statement about the reliability of the detection of the object is immediately made possible depending on the respective position of a captured object. In practice, the confidence level for different positions decreases here the further away an object is from the vehicle. Even when objects are the same distance away, differences in the confidence values, for example due to different angular positions in relation to the vehicle, can also result, depending on sensor properties of the at least one environment sensor.

Calibration of the confidence level—the problem of predicting probability estimates which are representative of the actual correctness probability—is important in many applications, for example for models of deep neural networks. Modern, very deep neural networks are often poorly calibrated and may be reliant on the underlying training data. Factors such as depth, resolution, weight decay and batch normalization (even for the training processes) are important factors which influence the calibration. These problems can be reduced by using the a priori determined confidence values.

Calibrated confidence level estimates are important for the interpretability of an artificial intelligence here. As opposed to artificial intelligence, human beings have a natural cognitive intuition for probabilities. Good confidence level estimates constitute valuable additional information in order to establish the trustworthiness of the artificial intelligence with respect to a human user and thus to increase the acceptance thereof—in particular for an artificial intelligence, the classification decisions of which can be difficult to interpret. Good probability estimates can furthermore be used in order, for example, to integrate neural networks into other probabilistic models.

The steps of performing reference measurements, of generating confidence values and of training the artificial intelligence are typically performed once for the method. These steps can furthermore be performed once centrally for the purpose of providing a plurality of driving assistance systems such that the confidence values and the trained artificial intelligence can be equally used for the plurality of driving assistance systems. As will be apparent from the following statements, the training of the artificial intelligence can take place in part independently of the confidence values and these steps can thus take place in a different order.

The steps of capturing the environment of the vehicle by the at least one environment sensor and of processing the point cloud using the trained artificial intelligence for the content capture of the environment relate to the operation of the vehicle. These steps are therefore each performed individually in each driving assistance system. These steps are furthermore performed repeatedly in the driving assistance system in order to perform continuous content capture of the environment.

The reference measurements can in principle be performed on a reference measurement stand as well as in the moving vehicle. The reference object is preferably a predefined object with defined properties such as size and reflectivity and may be dependent on the type of the environment sensor used.

The reference measurements can be performed repeatedly until reference objects have been captured for all the positions in the environment. The reference measurements can be performed in such a way here that, for individual reference measurements, a plurality of reference objects are simultaneously positioned at different positions so that they can be considered simultaneously.

The positions can be defined, for example, by a raster which is laid over the environment of the vehicle.

The confidence values typically indicate true-positive confidence levels for a correct detection of the reference object at the corresponding positions. Alternative definitions for the confidence values are likewise possible.

The artificial intelligence can be a neural network, in particular a deep neural network. Alternatively, a support vector machine can also be used as artificial intelligence. The artificial intelligence generates a semantic interpretation of sensor information which represents the environment of the vehicle. The sensor information can comprise the point cloud and in principle any further sensor information, for example images from optical cameras, which can be processed together by the artificial intelligence. On the basis of the sensor information, when processing the point cloud using the trained artificial intelligence, objects such as passenger cars, bicycles or pedestrians, for example, can be detected. The detection can take place here via so-called bounding boxes.

The artificial intelligence is thus not limited to using the sensor information of the at least one environment sensor considered here. Through the additional use of the confidence values, however, the functioning of the artificial intelligence with regard to the processing of the sensor information of this at least one environment sensor, and therefore also overall, can be improved.

The positions in the environment in relation to the at least one environment sensor can be indicated in different ways for the performing of the reference measurements as well as for the generating of the confidence values. Due to the functioning of the environment sensors considered here, it is advisable, for example, to indicate the positions as angular information (polar angle and optionally azimuth angle) together with an item of distance information. Alternatively, the positions can be indicated in Cartesian coordinates, the at least one environment sensor preferably defining a zero point of the coordinate system.

The training point cloud is a point cloud, as is also provided by the at least one environment sensor, which however typically comprises additional training information that is required for the training, for example in the form of annotations.

In one advantageous configuration of the invention, the generating of confidence values depending on positions in the environment in relation to the at least one environment sensor on the basis of the reference measurements by the at least one environment sensor of the vehicle in order to capture the reference objects involves generating the confidence values as a function of a frequency of correctly received sensor echoes at the corresponding position for the reference object positioned there. For this purpose, for the reference measurements, the reference objects can be placed in the environment of the vehicle and such a reference scene can be recorded over a relatively long period of time. From a plurality of individual reference measurements, the frequencies for the true-positive and/or false-negative detection of the reference objects, for example, are then ascertained by determining the relative number of measurements in which the point cloud detects or does not detect the reference object. In the case of the lidar-based environment sensor, a single laser point, for example, can in principle be sufficient here in order to capture the reference object at its position.

In one advantageous configuration of the invention, the generating of the confidence values is performed as a function of a frequency of correctly received sensor echoes at the corresponding position for the reference object positioned there while taking into account intensities of the received sensor echoes at the corresponding position for a reference object positioned there, and/or the generating of the confidence values is performed as a function of a frequency of correctly received sensor echoes at the corresponding position for the reference object positioned there while taking into account an echo pulse width of the received sensor echoes at the corresponding position for a reference object positioned there. Current versions of the environment sensors considered make it possible not only to determine the distance of the echoes but also to determine the intensity or the echo pulse width (EPW) of the received sensor echoes which can be used when generating the confidence values. An additional information channel, which allows improved generation of the confidence values, is provided. Low values of the measured intensity or EPW tend to be a sign of lower detection reliability, in particular if the intensity or EPW approaches the lower detection threshold or the lower limit of the environment light noise. The echo pulse width specifies a reception duration of the received sensor echo. By comparing with a duration of the emitted signal pulse, a measure of the reception intensity can thus be provided. The echo pulse width thus correlates with the intensity of the received sensor echo.

In one advantageous configuration of the invention, the generating of confidence values depending on positions in the environment in relation to the at least one environment sensor on the basis of the reference measurements by the at least one environment sensor of the vehicle in order to capture the reference objects involves generating a confidence map using the generated confidence values. The confidence map reflects the environment of the vehicle and is typically centered on the basis of the position of the vehicle. In a confidence map with true-positive confidence levels, the confidence values decrease the further away the position is from the vehicle. When approaching a distance limit of the at least one environment sensor, the confidence values ultimately approach the value zero. The entries of the confidence map can also have systematic dependencies, for example on an angle of the corresponding position in relation to the vehicle, which can result, for example, due to a reduced capture probability at edges of a field of view of the at least one environment sensor.

In one advantageous configuration of the invention, the performing of reference measurements by the at least one environment sensor of the vehicle in order to capture reference objects depending on positions in the environment in relation to the at least one environment sensor involves performing reference measurements for different environment conditions, and the generating of confidence values depending on positions in the environment in relation to the at least one environment sensor on the basis of the reference measurements by the at least one environment sensor of the vehicle in order to capture the reference objects involves generating the confidence values for the different environment conditions and/or operating conditions. The confidence values can thus be generated, for example, as multi-dimensional confidence values for the respective positions and be used depending on the respective current environment conditions and/or operating conditions. The environment conditions can comprise, for example, an environment temperature, an environment brightness, a particular lighting situation such as backlight, precipitation, air humidity or else atmospheric turbulence, to name just a few. The operating conditions can comprise, for example, driving parameters of the vehicle such as its speed, inclination, or others, as well as internal functional parameters of the at least one environment sensor.

In one advantageous configuration of the invention, the generating of confidence values depending on positions in the environment in relation to the at least one environment sensor on the basis of the reference measurements by the at least one environment sensor of the vehicle in order to capture the reference objects involves generating the confidence values on the basis of a specification of the at least one environment sensor for different environment conditions and/or operating conditions. Multi-dimensional confidence values for the respective positions can thus also be generated here, the generating taking place, for example, on the basis of a reference measurement or a plurality of reference measurements for an environment condition and/or operating condition. Proceeding therefrom, the confidence values can be determined for the different environment conditions and/or operating conditions on the basis of the specification of the at least one environment sensor, as a result of which the outlay for performing the reference measurements can be reduced. The confidence values can consequently also be generated here, for example, as multi-dimensional confidence values for the respective positions and be used depending on the respective current environment conditions and/or operating conditions. The environment conditions can comprise an environment temperature, an environment brightness, a particular lighting situation such as backlight, precipitation, air humidity or else atmospheric turbulence, to name just a few. The operating conditions can comprise, for example, driving parameters of the vehicle such as its speed, inclination, or others, as well as internal functional parameters of the at least one environment sensor.

In one advantageous configuration of the invention, the training of the artificial intelligence for the content capture of the environment of the vehicle on the basis of training point clouds for the at least one environment sensor is performed using the generated confidence values depending on the positions in the environment as a priori confidence levels in order to improve the content capture of the environment of the vehicle. The generated confidence values can thus be used as an additional feature input channel for the training of the artificial intelligence in order to thereby improve the artificial intelligence and consequently achieve an improvement in the content capture of the environment.

In one advantageous configuration of the invention, the processing of the point cloud generated by the at least one environment sensor of the vehicle using the trained artificial intelligence for the content capture of the environment is performed using the generated confidence values depending on the positions in the environment as a priori confidence levels in order to improve the content capture of the environment of the vehicle. The confidence values are thus used directly for processing the point cloud generated by the at least one environment sensor of the vehicle. This can take place by using the generated confidence values as an additional feature input channel for the artificial intelligence in order to improve the content capture of the environment. Alternatively, the generated confidence values can be applied in the post-processing of outputs from the artificial intelligence in order to achieve an improvement in the content capture of the environment. For this purpose, simple scaling of object confidence levels which are output by the artificial intelligence for captured contents/objects can be performed, for example.

In one advantageous configuration of the invention, the processing of the point cloud generated by the at least one environment sensor of the vehicle using the trained artificial intelligence for the content capture of the environment involves outputting object confidence levels of captured objects in the environment of the vehicle, the object confidence levels being ascertained while taking into account the positions thereof in the environment of the vehicle and the generated confidence values for these positions in the environment. Contents or objects captured by the artificial intelligence can thus be assigned object confidence levels using the corresponding confidence values. For example, the corresponding confidence value can be used directly as the object confidence level. Alternatively, the artificial intelligence can output for detected contents/objects object confidence levels, which are adjusted depending on the positions of the captured contents/objects on the basis of the respective confidence values. The artificial intelligence can determine the object confidence levels for the detected contents/objects in different ways. The object confidence levels can be determined, for example, on the basis of matching captured objects with different object classes. When using bounding boxes, a distribution of points of the point cloud in the corresponding bounding box can be taken into account. Additionally or alternatively, intensities of points of the point cloud can be taken into account. In particular, when using bounding boxes, a distribution of intensities of the points of the point cloud in the corresponding bounding box can be taken into account.

In one advantageous configuration of the invention, the at least one environment sensor is designed as a lidar-based environment sensor or as a radar sensor. Both lidar-based environment sensors and radar sensors are suitable for providing a point cloud of the environment of the vehicle with a plurality of environment points. Each of the environment points is defined by its angular position in relation to the environment sensor and an associated distance value. The environment points thus indicate positions of the objects and structures in the environment of the vehicle. As a result, a geometric structure of the environment can be ascertained reliably and with high accuracy. Lidar-based environment sensors emit, for example, discrete laser pulses at an angular distance of about 0.1 degrees in the horizontal direction. Reflections of the emitted laser pulses are received by the lidar-based environment sensor and the corresponding distance value can be determined from a duration between emitting the laser pulse and receiving the associated reflection. The lidar-based environment sensor can emit the laser pulses in one or more scanning planes, the angular distance in the vertical direction being greater than in the horizontal direction when used on vehicles. The details regarding angular distances in the horizontal and vertical direction as well as a total number of scanning planes are dependent on the lidar-based environment sensor used in each case. The functioning of radar sensors is in principle similar and, as opposed to the lidar-based environment sensors is based on emitted radio signals.

The invention is explained in more detail below with reference to the attached drawing and on the basis of preferred embodiments. The features shown may each represent an aspect of the invention both individually and in combination. Features of different exemplary embodiments may be transferred from one exemplary embodiment to another.

Figure 2:
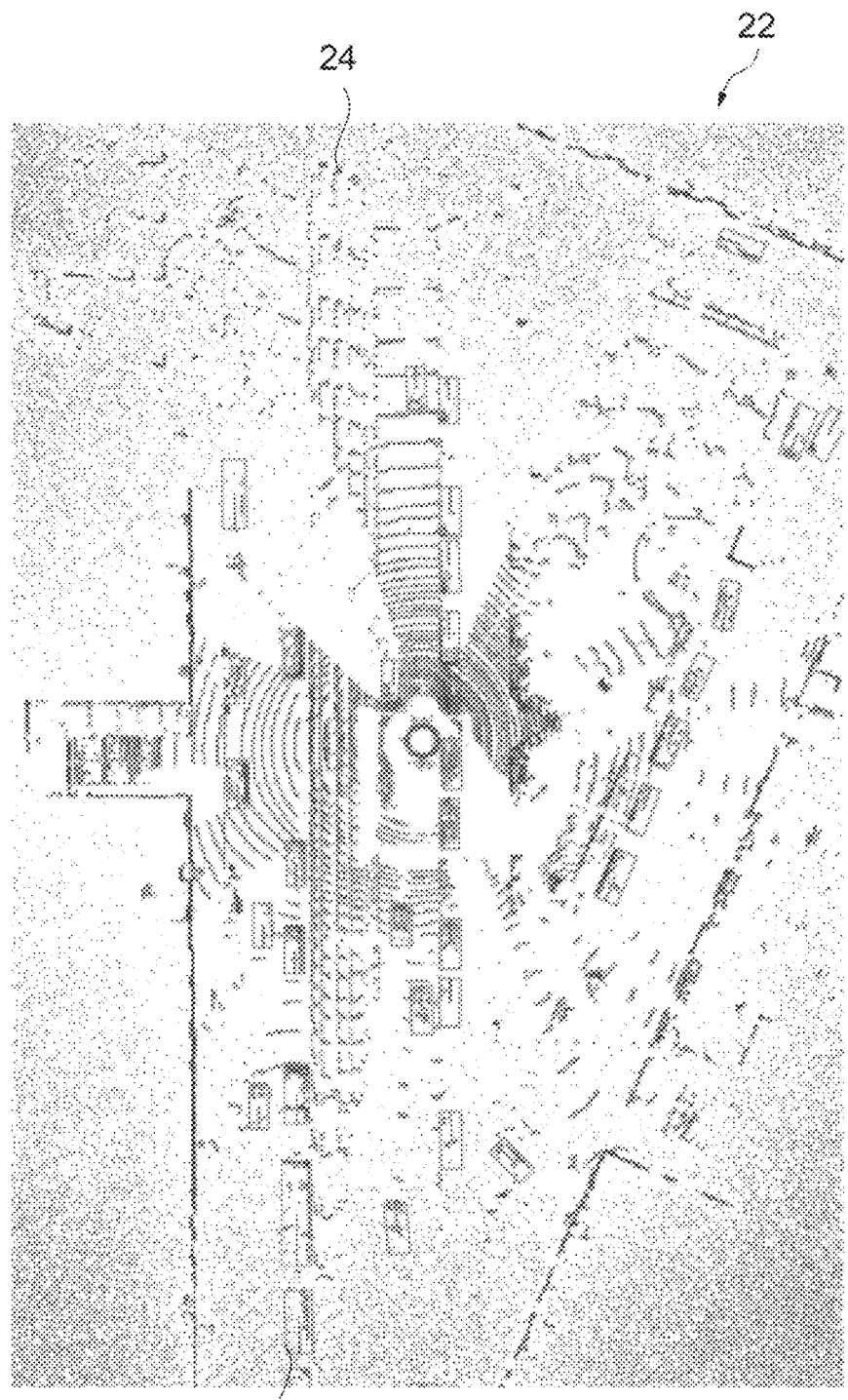
Figure 3:
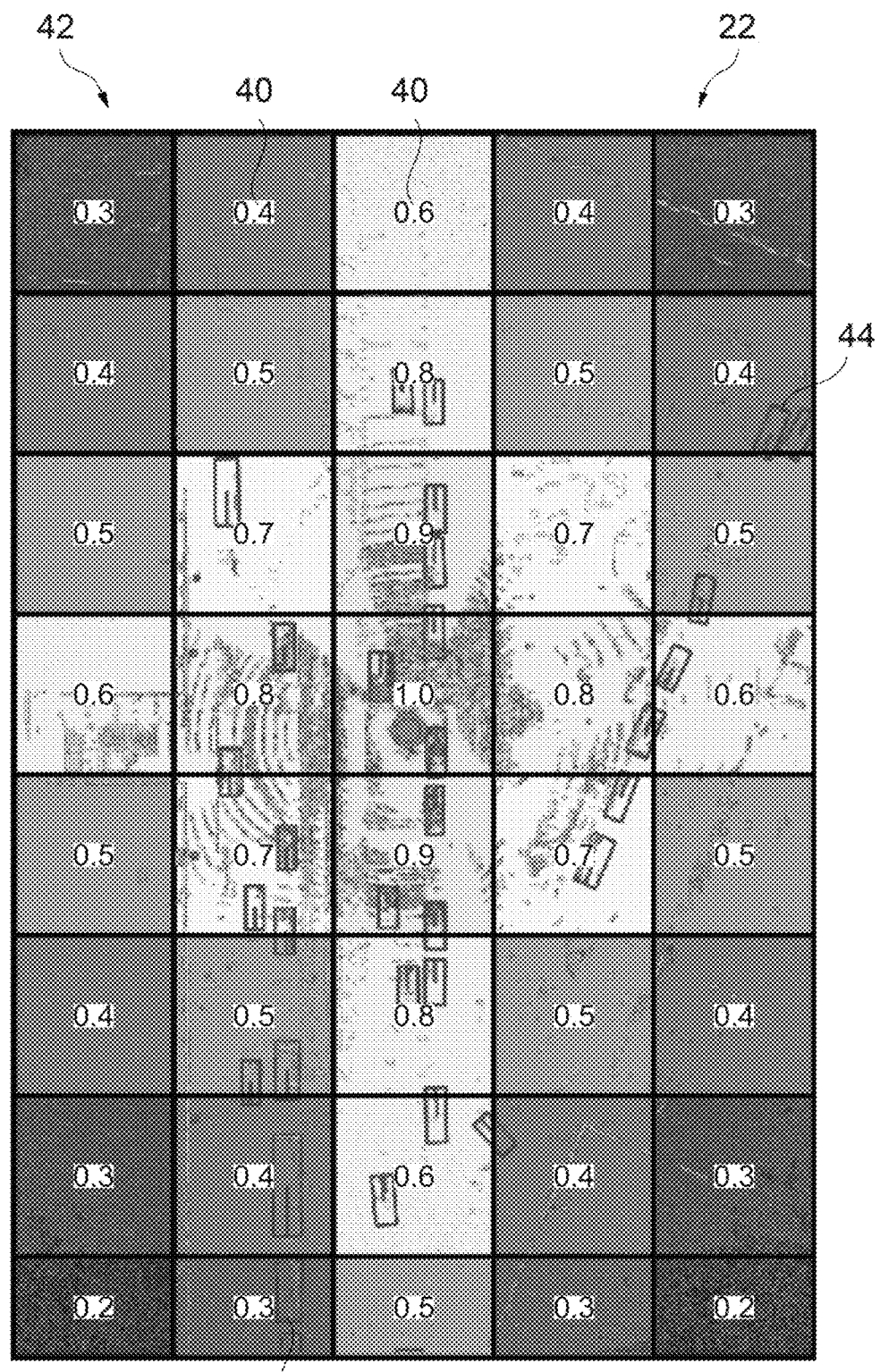
Figure 4:
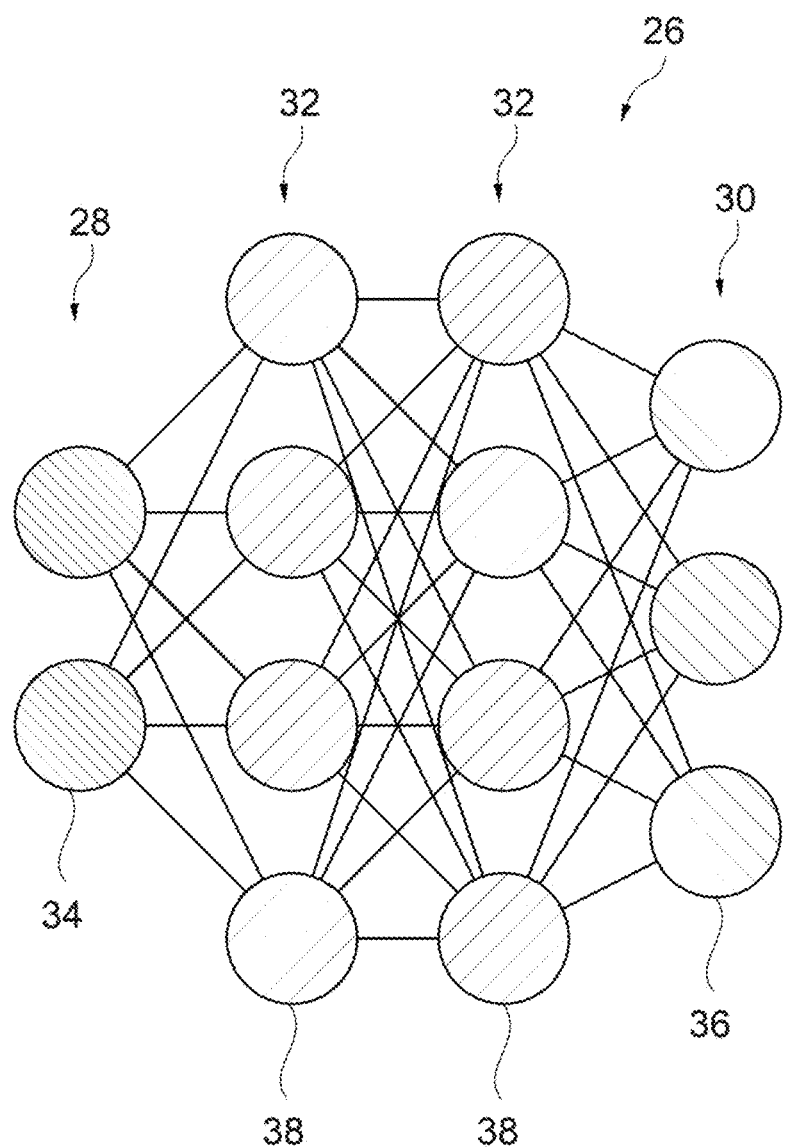
Figure 5:
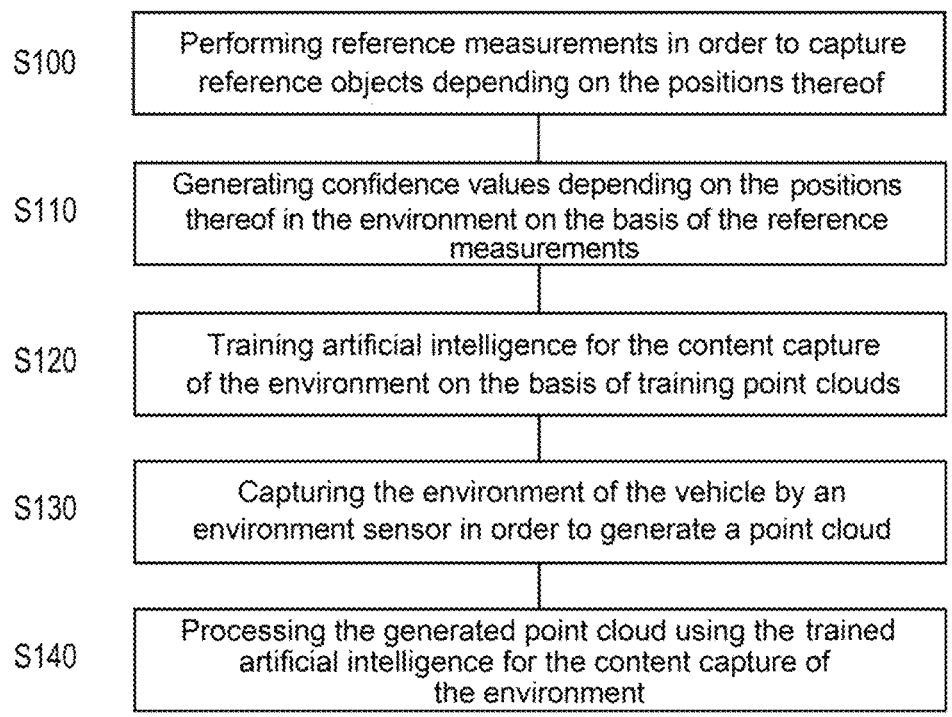

In the figures:

FIG. 1 shows a schematic view of a vehicle with a driving assistance system according to a first, preferred embodiment, the driving assistance system having a lidar-based environment sensor and a processing unit, which are connected to each other via a data connection, FIG. 2 shows an illustration of an exemplary point cloud, which was generated by the lidar-based environment sensor of the driving assistance system from FIG. 1, with detectable objects therein, FIG. 3 shows an illustration of a confidence map with confidence values for the environment of the vehicle and the point cloud from FIG. 2 as an overlay, FIG. 4 shows an exemplary, schematic illustration of a deep neural network for processing the point cloud generated by the environment sensor of the driving assistance system from FIG. 1, and FIG. 5 shows a flowchart of a method for the content capture of an environment of the vehicle from FIG. 1.

FIG. 1 shows a vehicle 10 with a driving assistance system 12 according to a first, preferred embodiment.

The driving assistance system 12 can be designed to provide any assistance functions for the driving of the vehicle 10 or with the vehicle 10. Driver assistance systems which assist a human driver when driving the vehicle 10, as well as providing functionalities for performing autonomous or semi-autonomous driving functions, may be involved here. Various driver assistance systems are known, for example, under the term ADAS (Advanced Driver Assistance Systems).

The driving assistance system 12 comprises an environment sensor 14, which is designed here as a lidar-based environment sensor 14. The driving assistance system 12 further comprises a processing unit 16 and a data connection 18, via which the lidar-based environment sensor 14 and the processing unit 16 are connected to each other.

The lidar-based environment sensor 14 is designed to capture an environment 20 of the vehicle 10. The environment 20 of the vehicle 10 relates here to an area captured by the lidar-based environment sensor 14.

The environment 20 is captured as a point cloud 22 with a plurality of environment points 24, as illustrated in FIG. 2 for example. The environment points 24 are generated by laser pulses being emitted and reflections of the emitted laser pulses being received, as a result of which a distance value can be determined from the resulting duration. Each of the environment points 24 is defined by its angular position in relation to the lidar-based environment sensor 14 and the associated distance value. Additionally, an intensity of the received reflections is captured.

The processing unit 16 comprises a processor and a memory in order to execute a program for performing an assistance function of the driving assistance system 12, and also in order to perform the method described below. The processing unit 16 receives and processes point clouds 22 provided by the lidar-based environment sensor 14. Such processing units 16 are known in the automotive sector as electronic control units (ECUs).

The data connection 18 is designed, for example, in the manner of a bus system customary in the automotive sector. Various bus systems such as CAN, FlexRay, LON or others are known in this context.

With reference to FIGS. 2 to 4, a method for the content capture of the environment 20 of the vehicle 10 using an artificial intelligence, which is designed here as a neural network 26, on the basis of the point clouds 22 generated by the lidar-based environment sensor 14 is described below. FIG. 5 shows a flowchart of the method.

The neural network 26 is illustrated by way of example and in a greatly simplified form in FIG. 4 and is designed here as a deep neural network 26. The neural network 26 comprises an input layer 28 and an output layer 30, between which two processing layers 32 are arranged here by way of example. Likewise by way of example, the input layer 28 comprises two input nodes 34, the output layer 30 comprises three output nodes 36 and the processing layers 32 each comprise four processing nodes 38, which are fully interconnected between the individual layers.

The method starts in step S100 with performing reference measurements by the lidar-based environment sensor 14 of the vehicle 10 in order to capture reference objects depending on positions in the environment 20 in relation to the lidar-based environment sensor 14.

The reference measurements are performed on a reference measurement stand. A predefined object with defined properties such as size and reflectivity is used as the reference object. The reference measurements are performed repeatedly until reference objects have been captured for all the positions in the environment 20. The reference measurements can be performed in such a way here that, for individual reference measurements, a plurality of reference objects are simultaneously positioned at different positions so that they can be considered simultaneously. In this exemplary embodiment, the positions are defined by a regular raster which is laid over the environment 20 of the vehicle 10.

The reference measurements are performed over a relatively long period of time here in order to obtain a plurality of individual reference measurements for each position of the reference object.

In an alternative exemplary embodiment, separate reference measurements are performed for different environment conditions. The environment conditions can comprise, for example, an environment temperature, an environment brightness, a particular lighting situation such as backlight, precipitation, air humidity or else atmospheric turbulence, to name just a few. The operating conditions can comprise, for example, driving parameters of the vehicle 10 such as its speed, inclination, or others, as well as internal functional parameters of the lidar-based environment sensor 14.

Step S110 relates to generating confidence values 40 depending on positions in the environment 20 in relation to the lidar-based environment sensor 14 on the basis of the reference measurements by the lidar-based environment sensor 14 of the vehicle 10 in order to capture the reference objects.

In this exemplary embodiment, the confidence values 40 indicate true-positive confidence levels for a correct detection of the reference object at the corresponding positions.

In detail, the generating of the confidence values 40 is performed as a function of a frequency of correctly received sensor echoes at the corresponding position for the reference object positioned there while additionally taking into account intensities of the received sensor echoes at the corresponding position for a reference object positioned there. From a plurality of the individual reference measurements, the frequencies for the true-positive and/or false-negative detection of the reference objects, for example, are then ascertained at the respective position by determining the relative number of measurements in which the point cloud 22 detects or does not detect the reference object at this position. A single environment point 24 can in principle be sufficient here to capture the reference object at its position.

Furthermore, a confidence map 42 is generated on the basis of the generated confidence values 40. The confidence map 42 is illustrated together with the point cloud 22 in FIG. 3 and is centered on the basis of the position of the vehicle 10. As can be seen in FIG. 3, the confidence values 40 decrease the further away the position is from the vehicle 10. Moreover, when positions are the same distance away, the confidence values 40 decrease depending on an angle with respect to a longitudinal direction of the vehicle 10.

In the alternative exemplary embodiment specified with regard to step S100, the confidence values 40 are generated for the different environment conditions and/or operating conditions. The confidence values 40 are generated, for example, as multi-dimensional confidence values 40 for the respective positions on the basis of the reference measurements for the different environment conditions and/or operating conditions and are used in the vehicle 10 depending on the respective current environment conditions and/or operating conditions.

In a further alternative embodiment, the reference measurements in step S100 are performed only for one environment condition and/or operating condition. In this case, the confidence values 40 for the different environment conditions and/or operating conditions can be generated on the basis of a specification of the lidar-based environment sensor 14 for different environment conditions and/or operating conditions. Multi-dimensional confidence values 40 can thus also be generated here for the respective positions.

Step S120 relates to training the neural network 26 for the content capture of the environment 20 of the vehicle 10 on the basis of training point clouds for the lidar-based environment sensor 14.

The training point cloud is a point cloud 22, as is also provided by the lidar-based environment sensor 14, which however typically comprises additional training information that is required for the training, for example in the form of annotations. The training point cloud can be supplied to the neural network 26, for example, at one of the input nodes 34 of the input layer 28.

In this exemplary embodiment, the training of the neural network 26 for the content capture of the environment 20 of the vehicle 10 on the basis of training point clouds for the lidar-based environment sensor 14 is performed using the generated confidence values 40 depending on the positions in the environment 20 as a priori confidence levels in order to improve the content capture of the environment 20 of the vehicle 10. The generated confidence values 40 are supplied to the neural network 26 at the other input node 34 of the input layer 28 as an additional feature input channel for the training of the neural network 26.

On the basis of the training, the neural network 26 can capture objects 44 from the point cloud 22 and detect the objects 44. In FIGS. 2 and 3, other vehicles are detected and illustrated as such objects 44 by way of example.

Step S130 relates to capturing the environment 20 of the vehicle 10 by the lidar-based environment sensor 14 of the vehicle 10 in order to generate the point cloud 22.

Generating point clouds 22 by the lidar-based environment sensor 14 is known as such and is therefore not explained any further.

The point cloud 22 is transmitted via the data connection 18 to the processing unit 16 for further processing.

Step S140 relates to processing the point cloud 22 generated by the lidar-based environment sensor 14 of the vehicle 10 using the trained neural network 26 for the content capture of the environment 20.

For the processing of the point cloud 22 generated by the lidar-based environment sensor 14 of the vehicle 10, the point cloud is supplied to the trained neural network 26 at one of the input nodes 34 of the input layer 28.

Additionally, any further sensor information, for example images from optical cameras, can in principle be supplied to the neural network 26 and processed together with the point cloud 22.

The processing of the point cloud 22 generated by the lidar-based environment sensor 14 of the vehicle 10 using the trained neural network 26 for the content capture of the environment 20 is performed here using the generated confidence values 40 of the confidence map 42 depending on the positions in the environment 20 as a priori confidence levels in order to improve the content capture of the environment 20 of the vehicle 10.

The generated confidence values 40 depending on the positions in the environment 20 can be used here as a priori confidence levels in order to improve the content capture of the environment 20 of the vehicle 10. The generated confidence values 40 are thus supplied to the neural network 26 at the other input node 34 of the input layer 28 as an additional feature input channel.

Alternatively or additionally, the generated confidence values 40 can be applied in the post-processing of outputs from the neural network 26 in order to achieve an improvement in the content capture of the environment. For this purpose, for example, scaling of object confidence levels which are output by the neural network 26 for captured objects 44 can be performed. For example, the object confidence levels output by the neural network 26 for captured objects 44 can be multiplied by the confidence values 40 at the positions of the captured objects 44. The neural network 26 can determine the object confidence levels for the detected objects 44, for example on the basis of matching captured objects 44 with different object classes. When using bounding boxes, a distribution of environment points 24 of the point cloud 22 in the corresponding bounding box can be taken into account. Additionally or alternatively, intensities of environment points 24 of the point cloud 22 can be taken into account. In particular, when using bounding boxes, a distribution of intensities of the environment points 24 of the point cloud 22 in the corresponding bounding box can be taken into account.

Further alternatively or additionally, the processing of the point cloud 22 generated by the lidar-based environment sensor 14 of the vehicle 10 using the trained neural network 26 for the content capture of the environment 20 can involve outputting object confidence levels of captured objects 44 in the environment 20 of the vehicle 10, the object confidence levels being ascertained while taking into account positions of the objects 44 in the environment 20 of the vehicle 10 and the generated confidence values 40 for these positions in the environment 20. Object confidence levels are thus assigned to the objects 44 captured by the neural network 26 on the basis of the corresponding confidence values 40.

LIST OF REFERENCE SIGNS

10 Vehicle
12 Driving assistance system
14 Environment sensor
16 Processing unit
18 Data connection
20 Environment
22 Point cloud
24 Environment point
26 Neural network, artificial intelligence
28 Input layer
30 Output layer
32 Processing layer
34 Input node
36 Output node
38 Processing node
40 Confidence value
42 Confidence map
44 Object

The invention claimed is:

1. A method for the content capture of an environment of a vehicle using an artificial intelligence neural network, on the basis of a point cloud generated by at least one environment sensor of the vehicle, the method comprising:
performing reference measurements by the at least one environment sensor of the vehicle in order to capture reference objects depending on positions in the environment in relation to the at least one environment sensor;
generating confidence values depending on positions in the environment in relation to the at least one environment sensor on the basis of the reference measurements by the at least one environment sensor of the vehicle in order to capture the reference objects;
training the artificial intelligence for the content capture of the environment of the vehicle on the basis of training point clouds for the at least one environment sensor;
capturing the environment of the vehicle by the at least one environment sensor of the vehicle in order to generate the point cloud; and
processing the point cloud generated by the at least one environment sensor of the vehicle using the trained artificial intelligence for the content capture of the environment,
wherein the method uses the generated confidence values depending on the positions in the environment as a priori confidence levels in order to improve the content capture of the environment of the vehicle,
wherein the training of the artificial intelligence neural network, on the basis of training point clouds for the at least one environment sensor, is performed using the generated confidence values depending on the positions in the environment as a priori confidence levels to improve the content capture of the environment of the vehicle.

2. The method as claimed in claim 1, wherein the generating of confidence values depending on positions in the environment in relation to the at least one environment sensor on the basis of the reference measurements by the at least one environment sensor of the vehicle in order to capture the reference objects involves generating the confidence values as a function of a frequency of correctly received sensor echoes at the corresponding position for the reference object positioned there.

3. The method as claimed in claim 2, wherein:
the generating of the confidence values as a function of a frequency of correctly received sensor echoes at the corresponding position for the reference object positioned there is performed while taking into account intensities of the received sensor echoes at the corresponding position for a reference object positioned there, and/or
the generating of the confidence values as a function of a frequency of correctly received sensor echoes at the corresponding position for the reference object positioned there is performed while taking into account an echo pulse width of the received sensor echoes at the corresponding position for a reference object positioned there.

4. The method as claimed in claim 1, wherein the generating of confidence values depending on positions in the environment in relation to the at least one environment sensor on the basis of the reference measurements by the at least one environment sensor of the vehicle in order to capture the reference objects involves generating a confidence map using the generated confidence values.

5. The method as claimed in claim 1, wherein:
the performing of reference measurements by the at least one environment sensor of the vehicle in order to capture reference objects depending on positions in the environment in relation to the at least one environment sensor involves performing reference measurements for different environment conditions, and
the generating of confidence values depending on positions in the environment in relation to the at least one environment sensor on the basis of the reference measurements by the at least one environment sensor of the vehicle in order to capture the reference objects involves generating the confidence values for the different environment conditions and/or operating conditions.

6. The method as claimed in claim 1, wherein the generating of confidence values depending on positions in the environment in relation to the at least one environment sensor on the basis of the reference measurements by the at least one environment sensor of the vehicle in order to capture the reference objects involves generating the confidence values on the basis of a specification of the at least one environment sensor for different environment conditions and/or operating conditions.

7. The method as claimed in claim 1, wherein the processing of the point cloud generated by the at least one environment sensor of the vehicle using the trained artificial intelligence for the content capture of the environment is performed using the generated confidence values depending on the positions in the environment as a priori confidence levels in order to improve the content capture of the environment of the vehicle.

8. The method as claimed in preceding claim 7, wherein the processing of the point cloud generated by the at least one environment sensor of the vehicle using the trained artificial intelligence for the content capture of the environment involves outputting object confidence levels of captured objects in the environment of the vehicle, the object confidence levels being ascertained while taking into account the positions thereof in the environment of the vehicle and the generated confidence values for these positions in the environment.

9. A driving assistance system for a vehicle comprising:
at least one environment sensor; and
a processing unit, which is connected to the at least one environment sensor via a data connection,
the driving assistance system being configured to perform the method as claimed in claim 1.

10. The driving assistance system as claimed in claim 9, wherein the at least one environment sensor is a lidar-based environment sensor or a radar sensor.

* * * * *